United States Patent [19]

Bertrand

[11] Patent Number: 5,066,119
[45] Date of Patent: Nov. 19, 1991

[54] OPTICAL DEVICE FOR PHASE DETECTION TESTING OPTICAL SYSTEMS, ESPECIALLY OPHTHALMIC LENSES

[75] Inventor: Patrick Bertrand, Issy les Moulineaux, France

[73] Assignee: Essilor International, Cie Generale d'Optique, Creteil Cedex, France

[21] Appl. No.: 527,435

[22] Filed: May 23, 1990

[30] Foreign Application Priority Data

Jun. 5, 1989 [FR] France .................. 89 07385

[51] Int. Cl.⁵ .................................................. G01B 9/00
[52] U.S. Cl. ............................................................ 356/124
[58] Field of Search ............... 356/124, 125, 126, 127

[56] References Cited
PUBLICATIONS

Applied Optics, vol. 27, No. 3, Feb. 1988, pp. 523-528; K. Omura et al.: "Phase Measuring Ronchi Test" pp. 525-527.
Applied Optics, vol. 23, No. 20, Oct. 1984, pp. 3676-3679; T. Yatagai: "Fringe Scanning Ronchi Test for Aspherical Surfaces" pp. 3677-3678.

Primary Examiner—F. L. Evans
Attorney, Agent, or Firm—Charles A. Brown

[57] ABSTRACT

A device for phase detection testing any kind of optical system, in particular an ophthalmic lens, comprises, along an optical path, an emission device which constitutes a light source, a holding station which receives the optical system under test, an array, a receiving device which receives the image observable downstream of the array, and a data processing device which exploits this image by phase detection. Between the light source and the holding station is a separator element which constitutes on the axis of the optical path a semi-reflecting surface. The receiving device is disposed to the side, in line with the separator element. The data processing device includes a ray plotting program and a calibration system allowing for theoretical and manufacturing aberrations due to the separator element.

13 Claims, 3 Drawing Sheets

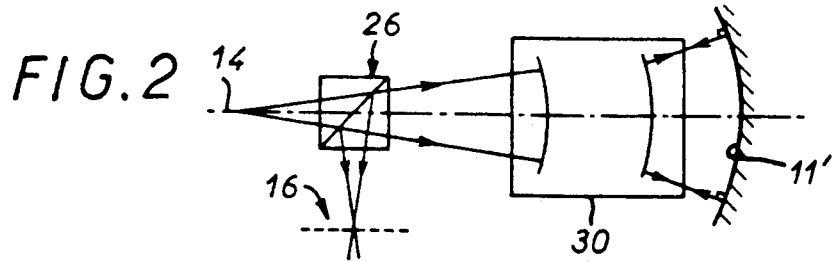
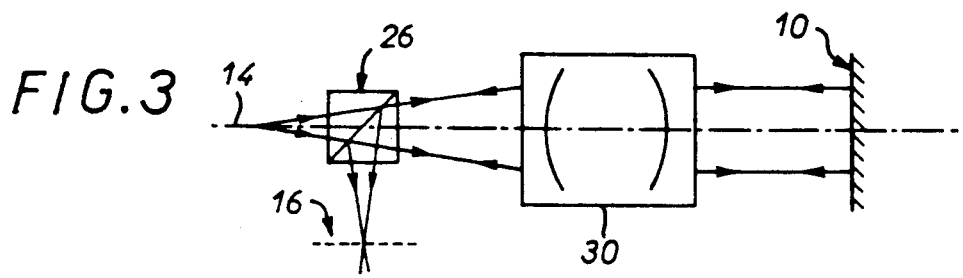
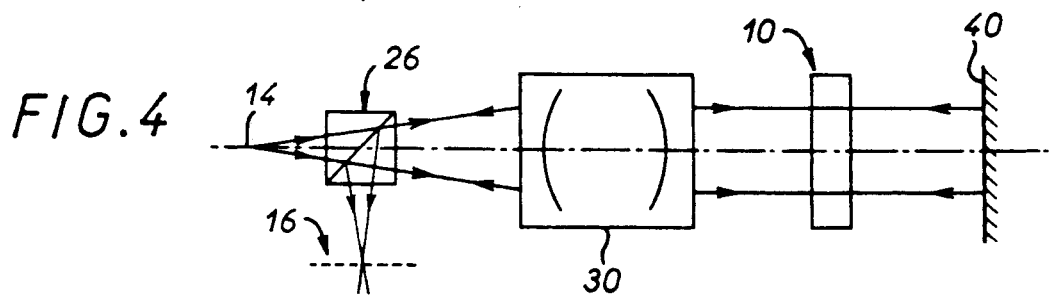
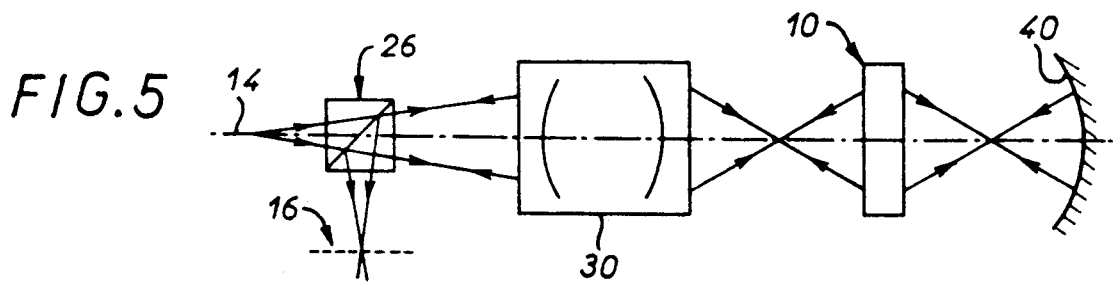
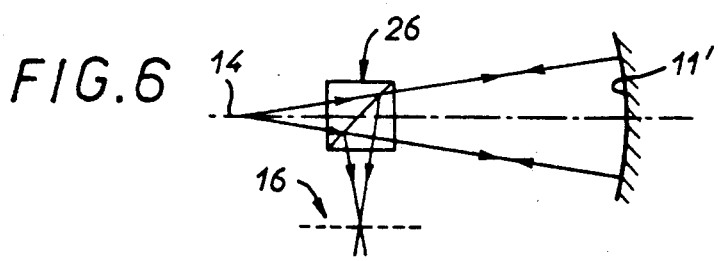
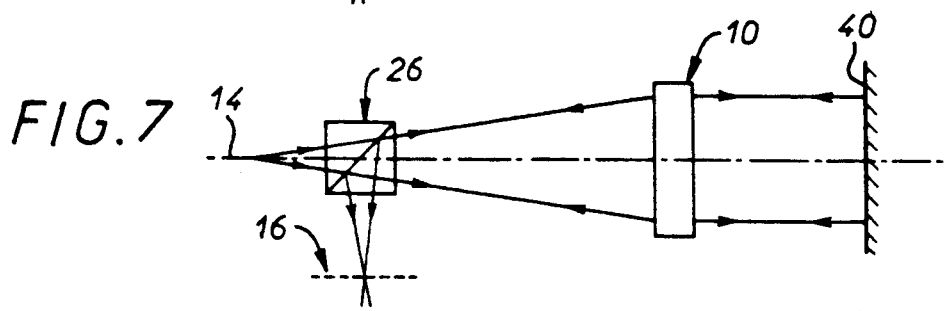

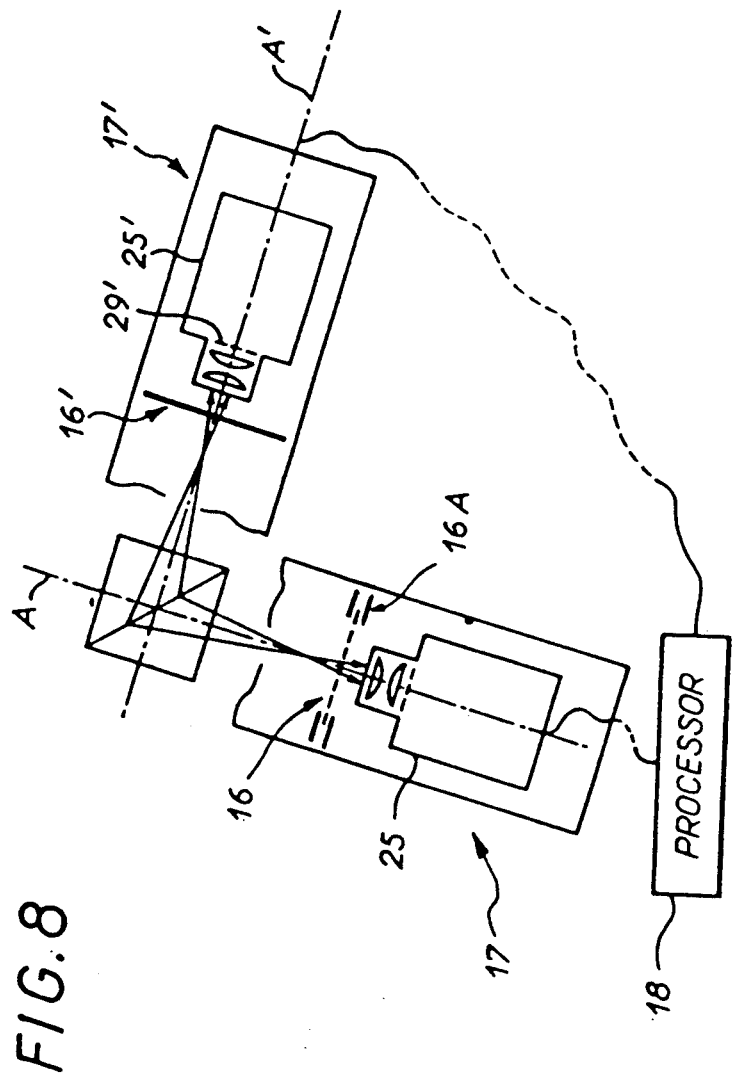

OPTICAL DEVICE FOR PHASE DETECTION TESTING OPTICAL SYSTEMS, ESPECIALLY OPHTHALMIC LENSES

BACKGROUND OF THE INVENTION

1. Field of the Invention

The present invention is generally concerned with testing any kind of optical system.

It is more particularly, but not necessarily exclusively, directed to testing any surface of an ophthalmic lens, whether it is a spherical or an aspherical surface, in order to evaluate its conformity with a nominal theoretical surface.

2. Description of the Prior Art

It is known that the performance of ophthalmic lenses depends in particular on their surfaces.

It has already been proposed to employ the RONCHI test to test an optical system using phase detection.

The known RONCHI test entails disposing at the point of convergence of the light wave from the optical system under test a diffraction of alternating array or grating opaque and transparent parallel lines and analyzing the system of fringes that can then be observed downstream of the array.

According to the laws of geometric optics, and ignoring diffraction phenomena, these fringes are always the same and depend only on the direction of the light rays constituting the wave concerned, without depending in any way at all on the nature of the medium that it has passed through. This being so, the fringes are characteristic of the aberrations of this wave.

Their slope represents the difference between the corresponding wave surface and the theoretical wave surface to which it should conform.

It then suffices to measure this slope at all points of the optical system under test, which is done in practise using the phase detection technique, and then to carry out an integration.

A method of this kind can be used to measure any defects of an optical system irrespective of its quality and has the advantage of being simple and of yielding very accurate results.

An optical device enabling this kind of method to be implemented is described in the article "Fringe scanning Ronchi test for aspherical surfaces" in the journal "APPLIED OPTICS", volume 23, number 20, of 15 Oct. 1984, and in the article "Phase measuring Ronchi test" in the same journal, volume 27, number 3, 1 Feb. 1988.

This optical device comprises, along an optical axis, emission means adapted to constitute a point source of coherent light, a holding station adapted to receive the optical system under test, a RONCHI grating, receiving means adapted to receive the image observable downstream of the RONCHI grating, and data processing means adapted to exploit this image by phase detection.

However, experience shows that as implemented this optical device cannot achieve the hoped for degree of accuracy.

Also, it cannot be used to test all optical systems or surfaces, and in particular it cannot be used for absolute measurement of the radius of a spherical object.

A general object of the present invention is an array-based optical device with significantly improved accuracy enabling any optical system or surface to be tested.

SUMMARY OF THE INVENTION

The present invention consists in an array-based optical device for phase detection testing an optical system comprising, on an optical path, emission means adapted to constitute a light source, a holding station adapted to receive the optical system under test, an array, receiving means adapted to receive the image observable downstream of the array, and data processing means adapted to exploit this image by phase detection and, between the light source and the holding station, a separator element adapted to constitute on the axis of the optical path a semi-reflecting surface, in which device said receiving means are disposed to the side, in line with said separator element and said data processing means include a ray plotting program and calibration means allowing for theoretical and manufacturing aberrations due to the separator element.

The separator element used in accordance with the invention advantageously makes it possible, when required, to operate by reflection rather than by transmission and therefore to test a surface by utilizing it as a reflecting surface on the upstream side of the array.

What is more, given the implementation in accordance with the invention of the calibration means, this separator element has no effect on the accuracy of the results obtained.

Of course, the device in accordance with the invention can, if required, be used to test an optical system by transmission.

To this end it is sufficient to place any plane or spherical mirror on the downstream side of the optical system under test.

In all these cases, and in accordance with one feature of the invention, it is possible to use between the separator element and the holding station a convergence adapter element allowing for the radius of curvature and the diameter of the optical surface under test which may comprise, as is well know, a converging or diverging transmission sphere together with a continuous aperture and f/number zoom, if the optical element under test is a surface, or a numerical aperture adapter element allowing for the numerical aperture and the object and image focal lengths of the optical system under test which may comprise, as is well known, a continuous aperture and f/number zoom, if this is an optical system operating by transmission.

In the specific instance of testing an aspherical optical element, it is possible in accordance with another feature of the invention to use between the separator element and the holding station a compensator element which may comprise, as is well known, a converger or diverger lens adapted to deliver a wave surface at least approximating that under test, in order to obtain fringes sufficiently far apart for phase detection to be effective.

In this case the compensator element may advantageously also constitute a convergence or numerical aperture adapter element.

In accordance with the invention, the calibration means then also allow for theoretical aberrations and aberrations resulting from the manufacture of the adapter and/or compensator element.

Thus in accordance with the invention the characteristics of the separator element and the adapter and/or compensator element, if used, are systematically allowed for, to the benefit of the accuracy of the results obtained.

The theoretical aberrations allowed for by the calibration means used in accordance with the invention mean here, in the usual way, when the optical element under test is an optical system, the aberrations due only to the combination of the optical components of the optical element, these being regarded as perfect in themselves.

The ray plotting program included in the data processing means that the device in accordance with the invention comprises advantageously enables these theoretical aberrations to be calculated for each optical surface in succession by simple application of DESCARTES' law.

The device in accordance with the invention can also be used for absolute measurement of the radius of curvature of an optical surface and therefore for absolute measurement of any surface defects.

Thus the device in accordance with the invention can advantageously be used for tolerance testing of the optical element under test, to determine whether any defects of the latter are inside or outside their acceptable tolerance limits.

What is more, the device in accordance with the invention has the advantage of being usable with various types of diffraction array.

Phase diffraction arrays such as WOLLASTON prisms are just as feasible for implementing the invention as amplitude arrays such as RONCHI gratings.

The device in accordance with the invention may, if required, use an incoherent spatially extended light source which has the advantage of achieving greater accuracy than a point light source, especially when using an amplitude array.

By incoherent spatially extended light source is meant here a light source as defined in M. FRANCON's "HOLOGRAPHIE", (Editions MASSON et Cie, 1969), pages 9 and 10.

Here an incoherent spatially extended light source can be used to obtain good quality fringes resulting from the superposition of a plurality of systems of fringes.

A rotating diffusing screen with the appropriate grain and speed of rotation is in practise sufficient to achieve this.

The characteristics and advantages of the invention will emerge from the following description given by way of example with reference to the appended diagrammatic drawings.

BRIEF DESCRIPTION OF THE DRAWINGS

FIG. 2 reproduces part of the diagram from figure 1 for a first alternative embodiment.

FIGS. 3 through 7 repeat respective parts of the block diagram from FIG. 1 for other alternative embodiments.

FIG. 8 is a block diagram in plan of a modified embodiment of the optical device in accordance with the invention.

DETAILED DESCRIPTION OF THE INVENTION

Figure 1:
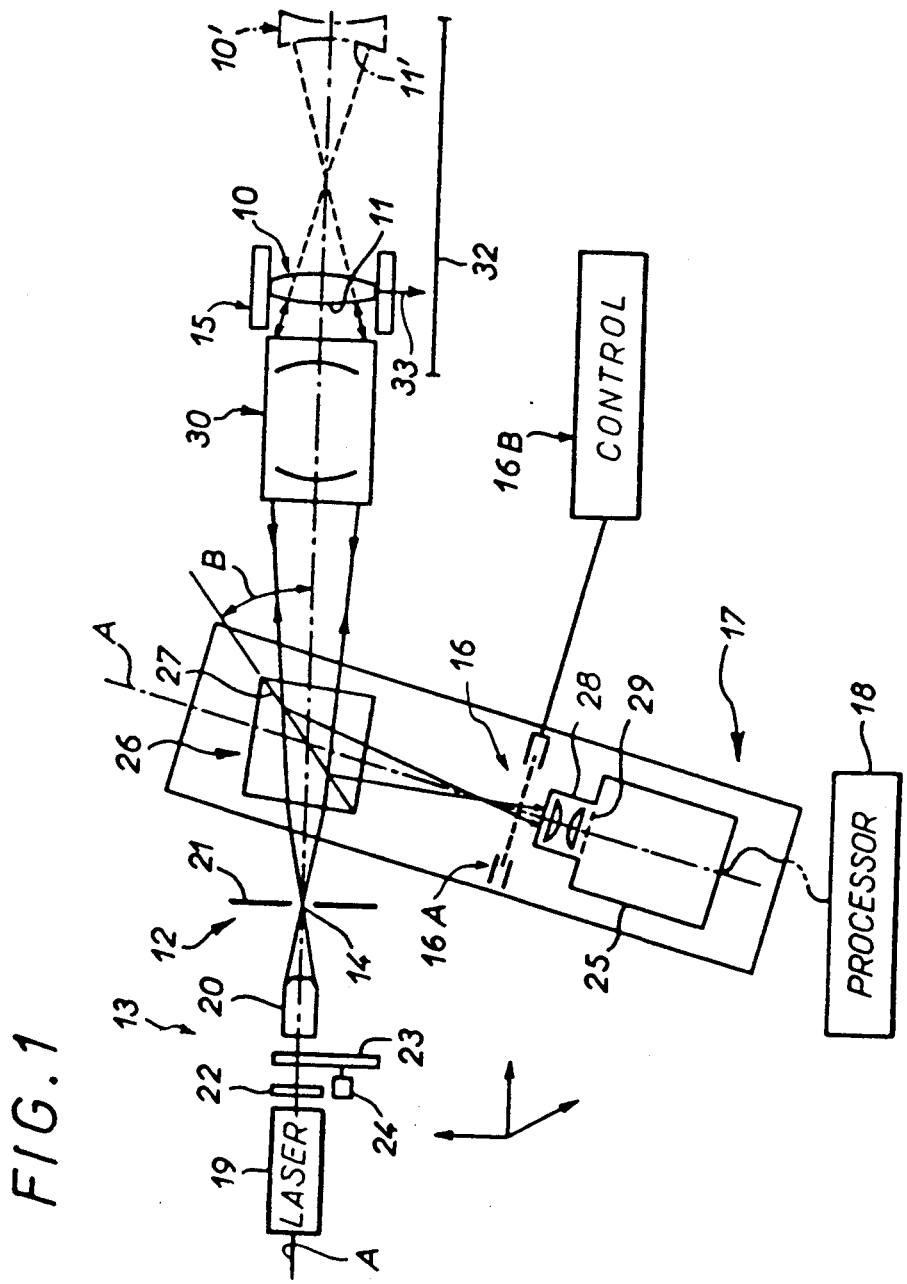
FIG. 1 is a block diagram in plan view of an optical device in accordance with the invention.

FIG. 1 shows by way of example and in full outline the application of the invention to the situation where the optical system 10 under test is an ophthalmic lens.

As shown in full outline, this may be a convex ophthalmic lens, for example, that is to say a lens with a positive optical power, the spherical or aspherical convex surface 11 of which is under test.

As shown in chain-dotted outline, however, it could equally well be a concave ophthalmic lens, that is to say a lens having a negative optical power, a concave surface 11' of which is under test.

The optical device 12 used for testing the optical system consisting of the single ophthalmic lens 10, 10' comprises, along an optical path with axis A, emission means 13 adapted to constitute a light source, a holding station 15 adapted to receive an optical system, a grating or other diffraction 16, receiving means 17 adapted to receive the image observable on the downstream side of the grating 16 and data processing means 18 adapted to exploit this image by phase detection.

By data processing means is meant in this context both the data processing hardware employed and the associated software.

In the embodiment shown the emission means 13 comprise, in succession and in a known way, a laser 19 and an objective lens 20 focussing the light beam emitted by the laser 19 at a point 14 constituting the light source and located at the hole in a diaphragm 21, with a density means for varying transmitted light intensity 22 optionally disposed between the laser 19 and the objective lens 20.

In a way that is also known in itself the grating 16 is a RONCHI grating, for example, that is to say an grating formed of alternately opaque and transparent parallel lines with a spacing in the order of 0.25 to 4 mm, for example, and the receiving means 17 comprise a camera 25 of which the objective lens 28 and the scanning plane 29 are schematically represented.

This is a mosaic type camera, for example, that is to say a charge-coupled device (CCD) camera adapted, by scanning, to measure the quantity of light received at each point on its scanning plane 29, this scanning plane 29 constituting the means which actually receive the observable image.

In accordance with the invention, the optical device 12 comprises between the light source 14 and the holding station 15 a separator element 26 adapted to constitute a semi-reflecting surface 27 on the optical axis A; the receiving means 17 are disposed to one side, in line with the separator element 26, and the data processing means 18 associated with the receiving means 17 comprise a ray plotting program and calibration means adapted to allow for aberrations due to the separator element 26.

In the embodiment shown the separator element 26 is a cube formed by two prisms stuck together.

As shown here, it is preferably inclined to the optical axis A so that the semi-reflecting surface 27 that it forms is at an angle B which has a value different to 45° to the optical axis A.

Thus any spurious images due to reflection at the surfaces of the separator element 26 are advantageously displaced from the observation direction of the camera 25.

In the embodiment shown in FIG. 1 the optical device 12 further comprises, between the separator element 26 and the holding station 15, an adapter element 30 which may comprise, as is well known, a converging or diverging transmission sphere with a continuous aperture and f/number zoom for allowing for the radius of curvature and the diameter of the optical surface 11 under test and the calibration means are also adapted to allow for aberrations due to the adapter element 30.

As the surface 11 under test is a convex surface, the adapter element 30 is convergent.

If the optical surface 11 under test is a strongly aspherical surface the adapter element 30 can also constitute a compensator element which may comprise, as is well known, a diverger or converger lens for supplying at least partial compensation to enable the delivery of a wave surface at least relatively close to that being tested.

In what follows the element 30 will therefore be referred to as an adapter and/or compensator element.

The various components of the optical device 12 thus constituted are preferably carried by a common frame and at least some of them are free to move relative to the frame.

As the corresponding arrangements will be well known to those skilled in this art they will not be described here.

Suffice to say that the grating 16 is carried by plates 16A adapted to enable it to move in translation in either of two orthogonal directions perpendicular to the optical axis A and to rotate about a direction orthogonal to the previous two.

Taken as a whole, these plates 16A are further adjustable in position along the optical axis A so that the grating 16 that they carry can be disposed at or near the point of convergence of the light beam reflected by the convex surface 11 under test.

They are preferably governed by control means 16B so that they can be displaced in a controlled way.

Similarly, the camera 25 and the adapter and/or compensator element 30 are preferably movable along the optical axis A.

However, in this case positioning chocks are provided on the corresponding slideways to serve as reference points, in order to retain the previous calibration, should any components need to be changed (array, adapter and/or compensator element, etc).

As schematically shown in FIG. 1, the holding station 15 is preferably also carried by a plate (not shown) movable along the optical axis A, to allow for absolute measurements.

An electronic rule 32 schematically represented by a line in FIG. 1 cooperates with a marker 33 to measure displacements of the holding station 15.

The light beam from the emission means 13 of the light source 12 is in practise monochromatic. It passes through the separator element 26 and the adapter and/or compensator element 30 before it is reflected from the convex surface 11 under test of the ophthalmic lens 10.

The adapter and/or compensator element 30 is preferably arranged in such a way that the light rays from it impinge at all points on this convex surface 11 substantially perpendicular to it.

The returning light beam emerging from the adapter and/or compensator element 30 is deflected by the separator element 26 towards the grating 16, towards which it converges.

In practise the grating 16 is placed in the vicinity of the corresponding point of convergence in order to minimize the number of fringes in the observable image and thus to facilitate subsequent operations and increase the accuracy of the results obtained.

The wave surface reaching the grating 16 features aberrations as compared with the theoretical wave surface that should normally arrive at the grating 16. Observation of the fringes makes it possible to evaluate these aberrations.

As previously explained, the slope of these fringes represents the difference between the wave surface tested and the theoretical wave surface.

By theoretical wave surface is here meant the wave surface allowing for the theoretical surface of the optical system 10, 10' under test, the separator element 26 with any defects it may have and the adapter and/or compensator element 30 with any defects it may have.

To work back to the transverse aberration of the wave surface under test it is therefore sufficient, using the phase detection technique, to carry out a series of measurements with phase shifts between them, by moving the grating 16 stepwise a specific distance perpendicular to the optical axis A.

The number of such measurements is preferably odd.

In practise measurements in two orthogonal directions are needed to calculate the slope.

An integration is then sufficient to obtain the distance or nominal deviation between the wave surface under test and the theoretical wave surface at the point in question.

In practise all displacements of the mobile elements concerned are controlled by software enabling systematic and immediate exploitation of the results.

As software of this kind does not of itself constitute any part of the present invention it will not be described here.

The same applies to the ray plotting program which, in accordance with the invention, the data processing means 18 include.

A ray plotting program of this kind is conventional and therefore totally familiar to those skilled in the art. It is limited to applying DESCARTES' law (n sin i=n' sin i') to the successive optical surfaces.

The scanning plane 29 is preferably the conjugate plane of the plane of the part under test.

In the case of an optical system this is the plane of its pupil.

Alternatively, the optical system or part 10, 10, under test can, if required, be placed at a specific distance from the conjugate plane of the scanning plane 29.

In this case, this distance is allowed for in the calculations carried out by the data processing means 18 and in the ray plotting program.

With regard to the calibration means that, in accordance with the invention, the data processing means 18 also include, the sum of the aberrations to be allowed for is stored in a calibration file and is systematically subtracted from all the measurements carried out.

If the surface 11 under test of the optical system 10 concerned is an aspherical surface the calibration file is obtained in the following manner:

In a first stage the theoretical system of fringes $F_1$ that would be obtained if the adapter and/or compensator element 30 and the surface 11 were perfect, that is to say if both had geometrical and optical characteristics strictly identical to their theoretical characteristics, is calculated.

In a second stage a measurement is carried out with a perfect calibration system substituted for the optical system 10 and a system of fringes $F_2$ is obtained.

In a third stage the theoretical system of fringes $F_3$ which would be obtained with this perfect calibration system and the adapter and/or compensator element 30 assumed to be perfect is calculated. The difference $(F_2-F_3)$ is representative of manufacturing defects of the separator element 26 and of the adapter and/or compensator element 30.

The calibration file $F_C$ is equal to:

$$F_C = (F - F_3) + F_1$$

Let $F_M$ denote the system of fringes determined by the apparatus using the optical system 10.

The integration yielding the distance or nominal deviation between the wave surface under test and the theoretical wave surface will be carried out using the system of fringes resulting from the difference $(F_M - F_C)$.

As explained above, the aberrations systematically taken into account in accordance with the invention in respect of the separator element 26 and the adapter and/or compensator element 30 are the theoretical and/or manufacturing aberrations of these elements.

The resulting aberrations, as calculated on the basis of the difference $(F_M - F_C)$, essentially depend only on surface defects of the convex surface 11 under test.

It is therefore possible to deduce these defects very accurately.

In practise the accuracy of each of the optical surfaces of the adapter and/or compensator element 30 may advantageously be in the order of one wavelength whereas for analogous elements with no calibration means it must be no more than a fraction in the order of 1/20th of one wavelength.

This advantageously reduces the unit cost of the optical device 12 in accordance with the invention.

In an alternative embodiment of the invention the light source 14 is an incoherent spatially extended light source such as that defined in the work by M. FRANCON referred to above.

The hole in the diaphragm defines its size.

The diameter of this hole and therefore of the source 14 is in practise smaller than but of the same order of magnitude as the pitch of the array 16.

This diameter is preferably equal to one-half the pitch of the grating 16.

To achieve the required incoherence a diffusing screen 23 rotated by a motor 24 is placed between the laser 19 and the objective lens 20 on the downstream side of the density means 22.

In this way there is no phase relationship between the various points of the light source 14 used in accordance with the invention.

It will be readily understood that it is possible to modify the extent of the light source 14, if required.

It is sufficient, for example, to move the objective lens 20 when, as shown, it is on the output side of the diffusing screen 23.

If it is on the input side of the diffusing screen 23, it is sufficient to move the latter.

If the surface 11' under test is a concave surface the adapter and/or compensator element 30 can be a divergent compensator element or diverger lens as schematically shown in FIG. 2.

The optical device in accordance with the invention lends itself to numerous variant implementations and/or applications.

For example (FIG. 3), if the optical system 10 under test is a plane mirror the beam emerging from the adapter and/or compensator element 30 is a beam made up of parallel rays.

The same applies in FIG. 4 where double transmission is employed rather than reflection, the optical system 10 under test having the light passed through it in one direction and then in the opposite direction after reflection from an auxiliary mirror 40.

In the embodiment shown the auxiliary mirror 40 is a plane mirror.

It could equally well be a concave mirror, as shown in FIG. 5, for example, or a convex mirror.

The FIG. 5 embodiment also uses double transmission.

However, upstream of the adapter and/or compensator element 30 the beam is convergent and the same applies on the upstream side of the optical system 10 under test.

In the embodiments shown in FIGS. 6 and 7 there is no adapter and/or compensator element.

FIG. 6 relates to the testing by reflection of a concave optical surface 11'.

FIG. 7 relates to the testing by double transmission of any optical system 10.

In FIG. 8 a second optical path is provided with the axis A'. Deflected by a second separator element 26' with respect to the previous optical axis A, it enables measurement in two directions at once, for example.

To this end it comprises an grating 16' and receiving means 17', sharing data processing means 18 with the first part with the optical axis A.

As previously explained, the grating 16 and/or 16' could be a phase diffraction such as a WOLLASTON prism, for example, instead of an amplitude diffraction such as a RONCHI grating.

As is known, a WOLLASTON prism is formed by two single-axis birefringent prisms glued together with their axes perpendicular.

If a WOLLASTON prism is used it is necessary to associate with it in the known way two polarizers whose axes are oriented differently to those of the WOLLASTON prism, the first being placed in front of the WOLLASTON prism and the second between the WOLLASTON prism and the scanning plane 29 or 29' of the camera 25 or 25' included in the transmission means 17 or 17'.

The axes of these polarizers are preferably at 45° to the axes of the WOLLASTON prism.

It should also be emphasized that the optical device in accordance with the invention may equally well be used to test graded index optical systems, to determine the index profile, for example.

The present invention is therefore not limited to the embodiments described and shown but encompasses any variant execution and/or combination of the various component parts and any variant application.

I claim:

1. Optical device for phase detection testing of an optical system comprising, on an optical path having an optical axis, emission means defining a light source, a holding station for receiving an optical system under test, a diffraction array, image receiving means for receiving an image observable optically downstream of said diffraction array, data processing means connected to the receiving means for exploiting the image by phase detection, a separator element defining a semi-reflecting surface on the axis of the optical path between said emission means and said holding station, said diffraction array and said receiving means being disposed laterally of said separator means relative to the optical path and in optical alignment with said separator element, said data processing means having a ray plotting program and calibration means compensating for theoretical and manufacturing abberations due to said separator element.

2. Optical device according to claim 1, wherein the semi-reflecting surface of said separator element makes an angle with the optical axis different from 45°.

3. Optical device according to claim 1, further comprising plate means for adjustably displacing said diffraction array for translation in either of two orthogonal directions and for rotation about a direction perpendicular to said two directions.

4. Optical device according to claim 3, further comprising control means for controlling said plate means.

5. Optical device according to claim 3, wherein said plate means further provides adjustable displacement of said diffraction array along the optical path.

6. Optical device according to claim 3, further comprising displacement means for adjustably displacing said holding station along the optical path, a rule running generally parallel to said optical path for measuring displacements of said holding station along said optical path.

7. Optical device according to claim 1, further comprising an adapter element disposed between said separator element and said holding station for allowing for the radius of curvature and the diameter of the optical system, said calibration means also compensating for theoretical and manufacturing abberations due to the adapter element.

8. Optical device according to claim 1, wherein the optical system under test is aspherical, said optical device further comprising a compensator element disposed between said separator element and said holding station for delivering a wave surface relatively close to that of the optical system under test, said calibration means also compensating for theoretical and manufacturing abberations due to the compensator element.

9. Optical device according to claim 1, further comprising an adapter and compensator element disposed between said separator element and said holding station for allowing for the radius of curvature and the diameter of the optical surface, and for delivering of a wave system relatively close to that of the optical system under test, said calibration means also compensating for theoretical and manufacturing abberations due to the adapter and compensator element.

10. Optical device according to claim 1, wherein the light source is an incoherent spatially extended light source.

11. Optical device according to claim 1, further comprising a second optical path diverted from said first mentioned optical path by said separator element, a second diffraction array and additional receiving means being provided along said second optical path, said data processing means being also connected to said additional receiving means for processing the image formed by said second diffraction array.

12. Optical device according to claim 1, wherein said diffraction array comprises a Ronchi grating.

13. Optical device according to claim 1, wherein said diffraction array comprises a Wollaston prism.

* * * * *